United States Patent
Kritt et al.

(10) Patent No.: US 9,419,967 B2
(45) Date of Patent: *Aug. 16, 2016

(54) CONFIDENTIAL INFORMATION ACCESS VIA SOCIAL NETWORKING WEB SITE

(71) Applicant: International Business Machines Corporation, Armonk, NY (US)

(72) Inventors: Barry A. Kritt, Raleigh, NC (US); Douglas A. Law, Chapel Hill, NC (US); Shawn K. Sremaniak, Raleigh, NC (US); Thomas S. Mazzeo, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/495,026

(22) Filed: Sep. 24, 2014

(65) Prior Publication Data

US 2015/0012993 A1 Jan. 8, 2015

Related U.S. Application Data

(63) Continuation of application No. 13/436,932, filed on Mar. 31, 2012, now Pat. No. 9,210,165, which is a continuation of application No. 13/345,733, filed on Jan. 8, 2012, now Pat. No. 9,210,164.

(51) Int. Cl.
*H04L 29/06* (2006.01)
*G06Q 50/00* (2012.01)
*H04L 12/58* (2006.01)

(52) U.S. Cl.
CPC .............. *H04L 63/083* (2013.01); *G06Q 50/01* (2013.01); *H04L 51/32* (2013.01); *H04L 63/04* (2013.01); *H04L 63/0846* (2013.01); *H04L 63/104* (2013.01); *H04L 2209/42* (2013.01)

(58) Field of Classification Search
CPC ... H04L 63/04; H04L 63/083; H04L 63/0846; H04L 63/104; H04L 51/32; H04L 2209/42; G06Q 50/01
See application file for complete search history.

(56) References Cited

U.S. PATENT DOCUMENTS 6,853,982 B2  2/2005  Smith et al.
7,359,894 B1  4/2008  Liebman et al.
(Continued)

FOREIGN PATENT DOCUMENTS

CN  104040944  9/2014
DE  112013000511  11/2014
(Continued)

OTHER PUBLICATIONS

Non-final office action for U.S. Appl. No. 13/436,932 dated Mar. 29, 2013, 16 pp.
(Continued)

*Primary Examiner* — Joseph P Hirl
*Assistant Examiner* — Thomas Gyorfi
(74) *Attorney, Agent, or Firm* — Damion Josephs

(57) ABSTRACT

A server computing device for a social networking web site receives from a user, via access of the web site, confidential information regarding the user, including information that the user does not socially share on the web site. The device associates the confidential information with a user identifier that uniquely identifies the user on the web site, and with an export group identifier corresponding to a type of the confidential information. The device associates the export group identifier with a password different from a user password the user employs to access the web site. The device receives, from a third party, a purported user identifier, a purported export group identifier, and a purported password, which the device validates against the user identifier, the export group identifier, and the password. Where validation is successful, the device permits access to the confidential information by the third party.

20 Claims, 2 Drawing Sheets

(56) References Cited

U.S. PATENT DOCUMENTS

| | | |
|---|---|---|
| 7,802,293 B2 | 9/2010 | Boyer et al. |
| 7,996,468 B2 | 8/2011 | Cheah |
| 8,015,019 B1 | 9/2011 | Smith et al. |
| 8,145,719 B2 | 3/2012 | Barman et al. |
| 8,280,821 B1 | 10/2012 | Smith et al. |
| 9,210,164 B2 | 12/2015 | Kritt et al. |
| 9,210,165 B2 | 12/2015 | Kritt et al. |
| 2007/0130221 A1 | 6/2007 | Abdo et al. |
| 2008/0040370 A1 | 2/2008 | Bosworth et al. |
| 2008/0133445 A1 | 6/2008 | Pennington |
| 2009/0006124 A1 | 1/2009 | Sinclair et al. |
| 2009/0019062 A1 | 1/2009 | Saba |
| 2009/0049149 A1 | 2/2009 | Cheah |
| 2009/0171686 A1 | 7/2009 | Eberstadt |
| 2009/0210246 A1 | 8/2009 | Patel et al. |
| 2009/0307762 A1 | 12/2009 | Cudd, Jr. |
| 2010/0088364 A1 | 4/2010 | Carter et al. |
| 2010/0153224 A1 | 6/2010 | Livnat |
| 2010/0241652 A1 | 9/2010 | Fasihuddin et al. |
| 2011/0010297 A1 | 1/2011 | Sisodraker |
| 2011/0047625 A1 | 2/2011 | Steelberg et al. |
| 2011/0060797 A1 | 3/2011 | Balandin et al. |
| 2011/0131106 A1 | 6/2011 | Eberstadt et al. |
| 2011/0179161 A1 | 7/2011 | Guy et al. |
| 2012/0019568 A1 | 1/2012 | Nobori |
| 2012/0023332 A1 | 1/2012 | Gorodyansky |
| 2012/0143681 A1 | 6/2012 | Alcazar et al. |
| 2012/0158880 A1 | 6/2012 | Barman et al. |
| 2012/0324589 A1 | 12/2012 | Nukala et al. |
| 2013/0014284 A1 | 1/2013 | Vernal et al. |
| 2013/0179953 A1 | 7/2013 | Kritt et al. |
| 2013/0179990 A1 | 7/2013 | Kritt et al. |

FOREIGN PATENT DOCUMENTS

| | | |
|---|---|---|
| GB | 2513070 | 10/2014 |
| GB | 25513070 | 10/2014 |
| JP | 2002229953 | 8/2002 |
| JP | 2005088801 | 4/2005 |
| JP | 2008015818 | 1/2008 |
| JP | 2015510163 | 4/2015 |
| WO | 2009113154 | 9/2009 |
| WO | 2010109332 | 9/2010 |
| WO | 2012017612 | 2/2012 |
| WO | 2013102276 | 7/2013 |
| WO | 2013102276 A1 | 7/2013 |

OTHER PUBLICATIONS

Final office action for U.S. Appl. No. 13/436,932 dated Sep. 30, 2013, 17 pp.

Non-final office action for U.S. Appl. No. 13/436,932 dated Mar. 14, 2014, 8 pp.

Non-final office action for U.S. Appl. No. 13/436,932 dated Jan. 30, 2015 15 pp.

Non-final office action for U.S. Appl. No. 13/345,733 dated Mar. 27, 2013, 13 pp.

Final office action for U.S. Appl. No. 13/345,733 dated Sep. 27, 2013, 14 pp.

Non-final office action for U.S. Appl. No. 13/345,733 dated Mar. 13, 2014, 8 pp.

Non-final office action for U.S. Appl. No. 13/345,733 dated Feb. 20, 2015, 12 pp.

"LinkedIn for Groups: Members FAQ" 2003-2004, LinkedIn Ltd., printed Nov. 7, 2004, 7 pp. http://lab-robotics.org/LinkedIn/LinkedIn%20for%20Groups_%20Members%20FAQ.pdf.

Wikipedia entry for "LinkedIn", published Dec. 28, 2010, 6 pp. http://en.wikipedia.org/w/index/php?title+LinkedIn&oldid=404646802.

Shiroor, R.G., "The View from Service Layer" docbox.etsi.org/workshop/2010, 2010, 14 pp.

Mehra, A., "The Social Network Ties of Group Leaders: Implications for Group Performance and Leader Reputation", Organization Science, vol. 17, No. 1, Jan. 2006, 16 pp.

Baden, R., "Persona: An Online Social Network with User-Defined Privacy", SIGCOMM Conference on Data Communications, vol. 39, Issue 4, Oct. 2009, 12 pp.

Braden, R., "Report on IAB Workshop on Security in the Internet Architecture", IP.com/IPCOM000002472D, Jun. 1, 1994, 44 pp.

Notice of Allowance for U.S. Appl. No. 13/345,733 dated Jun. 8, 2015, 12 pp.

Notice of Allowance for U.S. Appl. No. 13/436,932 dated Jun. 5, 2015, 12 pp.

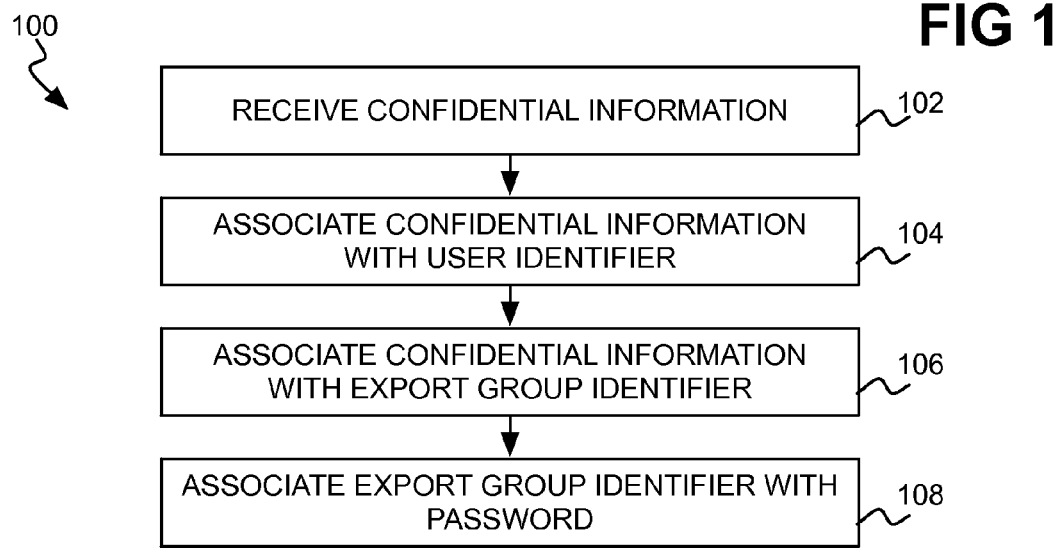
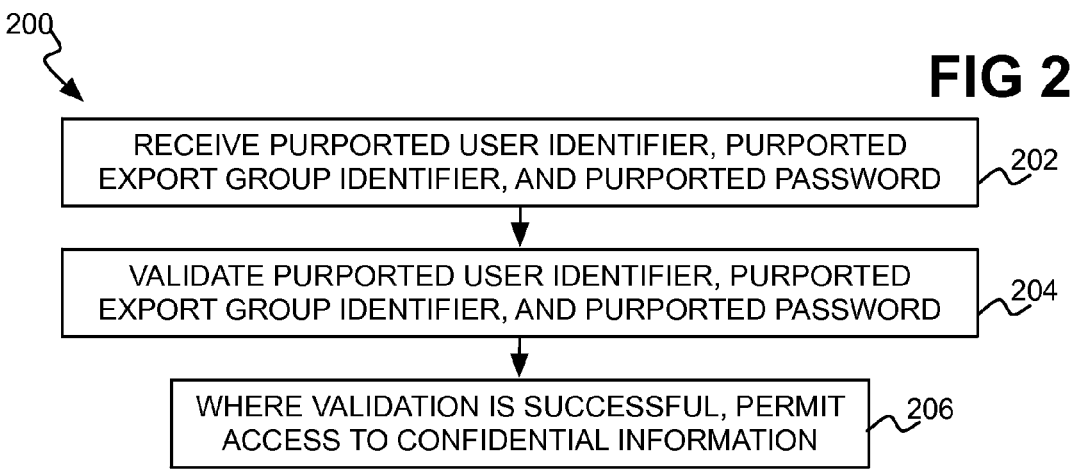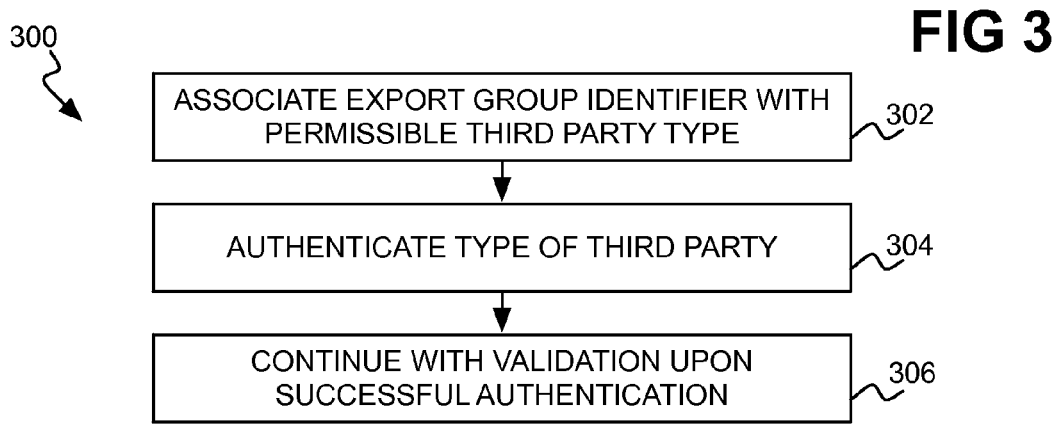

CONFIDENTIAL INFORMATION ACCESS VIA SOCIAL NETWORKING WEB SITE

RELATED APPLICATIONS

The present patent application is a continuation of the pending patent application Ser. No. 13/436,932, filed on Mar. 31, 2012, which itself is a continuation of the pending patent application Ser. No. 13/345,733, filed on Jan. 8, 2012.

BACKGROUND

Confidential information pervades most people's lives. A person has identifying personal information, such as a social security number, a driver's license number, and so on, which is shared just with trusted third parties for particular purposes. A person also has other confidential information that is shared with different types of third parties. For example, a person may share medical information with doctors and other medical professionals, financial information with stockbrokers and other financial professionals, and so on.

SUMMARY

A method of an embodiment of the disclosure includes receiving, by a server computing device for a social networking web site from a user via access of the social networking web site, confidential information regarding the user. The confidential information includes information regarding the user that the user does not socially share on the social networking web site. The method includes associating, by the server computing device for the social networking web site, the confidential information regarding the user with a user identifier that uniquely identifies the user on the social networking web site. The method includes associating, by the server computing device for the social networking web site, the confidential information regarding the user with an export group identifier corresponding to a type of the confidential information. The method includes associating, by the server computing device for the social networking web site, the export group identifier with a password different from a user password the user employs to gain access to the social networking web site. The export group identifier and the password are adapted to be shared by the user to a third party to permit the third party to access the confidential information through the social networking web site.

A method of another embodiment of the disclosure includes receiving, by a server computing device for a social networking web site from a third party via access of the social networking web site, a purported user identifier, a purported export group identifier, and a purported password. The method includes validating, by the server computing device for the social networking web site, the purported user identifier, the purported export group identifier, and the purported password against a user identifier, an export group identifier, and a password, respectively. Confidential information regarding a user, including information regarding the user that the user does not socially share on the social networking web site, is associated with the user identifier and with the export group identifier, and the export group identifier is associated with the password. The user identifier uniquely identifies the user on the social networking web site, the export group identifier corresponds to a type of the confidential information, and the password is different from a user password that the user employs to gain access to the social networking web site. The method includes where validation is successful, permitting, by the server computing device for the social networking web site, access to the confidential information regarding the user by the third party.

A computer program product of an embodiment of the disclosure includes a computer-readable storage medium having computer-readable code embodied therein. The computer-readable code is executable by a processor by a server computing device for a social networking web site. The computer-readable code includes first computer-readable code to receive, from a user via access of the social networking web site, confidential information regarding the user. The confidential information includes information regarding the user that the user does not socially share on the social networking web site. The computer-readable code includes second computer-readable code to associate the confidential information regarding the user with a user identifier that uniquely identifies the user on the social networking web site. The computer-readable code includes third computer-readable code to associate the confidential information regarding the user with an export group identifier corresponding to a type of the confidential information. The computer-readable code includes fourth computer-readable code to associate the export group identifier with a password different from a user password the user employs to gain access to the social networking web site. The export group identifier and the password are adapted to be shared by the user to a third party to permit the third party to access the confidential information through the social networking web site.

A system of an embodiment of the disclosure includes a server computing device. The system includes a social networking web site component implemented at the server computing device to provide a social networking web site. The system includes a confidential information access component implemented at the server computing device. The confidential information access component is to receive, from a third party via access of the social networking web site, a purported user identifier, a purported export group identifier, and a purported password. The confidential information access component is to validate the purported user identifier, the purported export group identifier, and the purported password against a user identifier, an export group identifier, and a password, respectively. Confidential information regarding a user, including information regarding the user that the user does not socially share on the social networking web site, is associated with the user identifier and with the export group identifier, and the export group identifier is associated with the password. The user identifier uniquely identifies the user on the social networking web site, the export group identifier corresponds to a type of the confidential information, and the password is different from a user password that the user employs to gain access to the social networking web site. The confidential information access component is to, where validation is successful, permit access to the confidential information regarding the user by the third party.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of a method for storing confidential information regarding a user at a server computing device via a social networking web site, according to an embodiment of the disclosure.

FIG. 2 is a flowchart of a method for accessing confidential information regarding a user at a server computing device via a social networking web site, according to an embodiment of the disclosure.

FIG. 3 is a flowchart of a method for adding third party type authentication to the methods of FIGS. 1 and 2, according to an embodiment of the disclosure.

DETAILED DESCRIPTION

Figure 4:
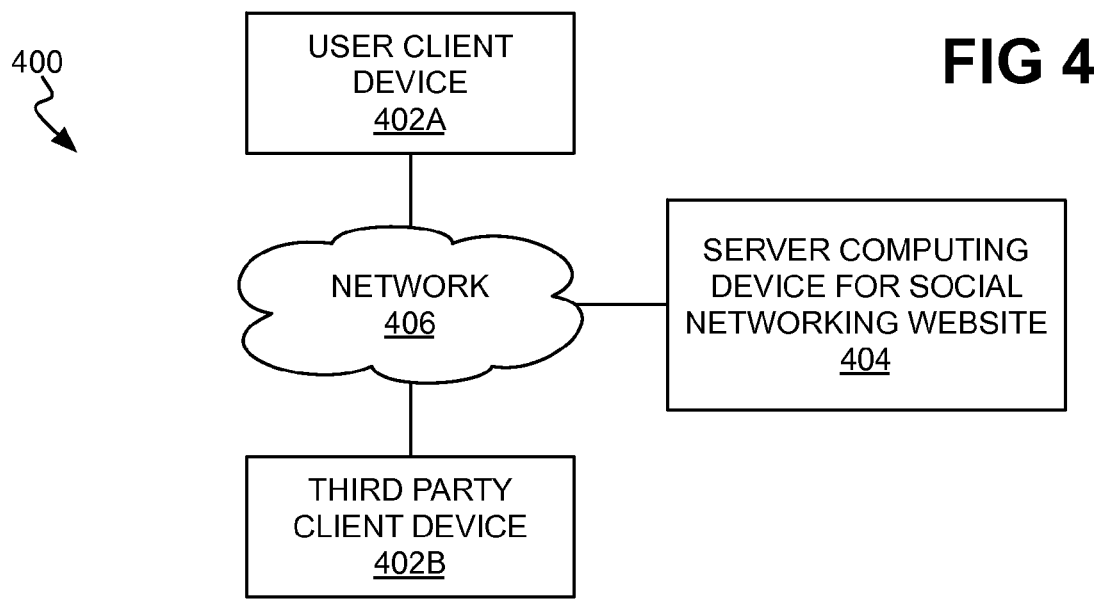
FIG. 4 is a diagram of a representative system, according to an embodiment of the disclosure.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, people maintain different types of confidential information, which are shared with different types of third parties, such as on as-needed basis. Sharing such information can be cumbersome, however, since usually each third party maintains its own electronic copy of a person's information. For example, when a person visits the office of a doctor with whom he or she has not consulted before, the person usually has to manually write out his or her confidential information, which is then manually keyed in by personnel at the office into a computer system. Existing medical records of the person are generally sent in paper form or via fax, and relevant information also manually keyed in by personal at the new doctor's office.

Existing solutions to alleviate such confidential information sharing difficulties have not received widespread adoption. For instance, smart cards and radio-frequency identifier (RFID) devices require people to carry physical items, and require third parties to maintain compatible equipment that can read the confidential information stored on these devices. Specialized web sites that are geared towards storing medical, automotive, and financial information, have also not had much success, at least in part because of a chicken-and-egg type of problem: third parties do not use them because not many people have signed up with the web sites, and not many people have signed up with them because third parties do not use them. Furthermore, such specialized web sites require users, as well as third parties, to learn how to use yet another web site, which users in particular may have become weary of doing so.

Disclosed herein are techniques to alleviate such difficulties with confidential information sharing. In particular, existing social networking web sites are innovatively extended to permit confidential information sharing, and thus used in a way that is basically antithetical to their social networking roots and thus to the primary and intended usage and functionality of these web sites. A user provides confidential information that includes information regarding the user that the user does not socially share on the social networking web site. The confidential information is associated with a user identifier of the user, and with an export group identifier corresponding to the type of the confidential information. The export group identifier is associated with a password different from a user password that the user employs to gain access to the social networking web site.

The user can thus share the export group identifier and the password, along with his or her user identifier, to permit a third party to access the confidential information through the social networking web site. The third party furnishes the export group identifier, the user identifier, and the password to the social networking web site. Upon validation by the social networking web site, the social networking web site permits the third party to access the confidential information in question.

These techniques provide an advantageous mechanism by which to govern and permit access to confidential information. There is no chicken-and-egg-type problem, because popular social networking web sites already have vast numbers of users. These users do not have to sign up at yet another web site, in other words, and further do not have to learn how to use yet another web site. In turn, third parties are more likely to get onboard with confidential information access through the techniques disclosed herein, because they know that their patients, customers, and other types of users are more likely to already be registered with such social networking web sites.

One insight and innovation that the techniques disclosed herein leverage is using social networking web sites for a decidedly non-social networking purpose: the sharing of confidential information in a non-social setting. The type of confidential information that the techniques disclosed herein share is decidedly non-social information. For example, although a person may want to limit photos of his or her newborn to close friends and family, such sharing is nevertheless social among these close people, and differs from the sharing of the person's social security number with a medical provider, which is not the social sharing of information. Stated another way, the techniques disclosed herein leverage the popularity of social networking web sites to permit these web sites to be used in an unintended manner (and indeed in an incongruous manner as compared to their ultimate reason for coming into existence)—namely the storage and access of confidential information that is not socially shared.

FIG. 1 shows a method 100, according to an embodiment of the disclosure. As with other methods disclosed herein, the method 100 can be performed by a server computing device for a social networking web site. A social networking web site is a web site for a social networking service. A social networking service is an online service that focuses on building and reflecting of social networks or social relations among people, who, for example, share interests and/or activities. A social network service includes a representation of each user (often a profile), his or her social links, and a variety of additional services. Social networking web sites permit users to share ideas, activities, events, and interests within their individual networks.

Confidential information regarding a user is received from a user via access of the social networking web site (102). The confidential information includes information regarding the user that the user does not socially share on the social networking web site. For example, the confidential information can include birthdate and birthplace information that the user may share with others in his or her social network, but also includes other information that the user does not share with others.

Such confidential information can include personally identifying information, like a social security number, a driver's license number, and so on. The confidential information can include medical information, such as a user's weight, height, prescription drug information, medical test information, and so on. The confidential information can include financial information, such as account numbers and balances at financial institutions at which the user has financial accounts. The confidential information can even include automotive information, such as the make, model, license plate number, and vehicle identification number (VIN) of each vehicle a user owns or leases. The confidential information can include other information regarding the user that the user does not socially share with others on the social networking web site as well.

The confidential information is associated with a user identifier that uniquely identifies the user on the social networking web site (104). One example of such a user identifier is a username. Another example of such a user identifier is the email address of the user.

The confidential information is associated with an export group identifier (106). The export group identifier corresponds to a type of the confidential information that has been received in part 102. For example, the export group identifier may be "medical" for medical information, "financial" for financial information, "automotive" for automotive information, and so on. Associating the confidential information with an export group identifier permits a user to segment different types of configuration information into different export groups. An export group is a group of information that a user authorizations the exportation of—i.e., the access by—third parties.

The export group identifiers may be hierarchically organized, or organized in other overlapping manners, so that a piece of confidential information is present within a number of different export groups without duplication. For example, a user's social security number may be part of a "personal" export group that is encompassed by both a "medical" export group and a "financial" export group, since third parties needing access to confidential information within the latter two groups is likely to need access to the user's social security number as well. As another example, a "medical" export group may encompass both a "blood test" export group that includes blood test results of a user, and a "medical imaging" export group that includes CT and MRI scans of the user. The user's doctor may receive access to the entire "medical" export group, whereas a blood draw facility may receive access to just the "blood test" export group.

The social networking web site itself may have predefined data elements for the confidential information, as well as predefined export groups, to ease and standardize the process of parts 102 and 106 in particular. The data elements and the export group identifiers may be stored in a markup language format document. For example, they may be stored in an extended markup language (XML) document.

The export group identifier is itself associated with a password (108), which may be provided by the user. This password is different from the user password that the user employs to access the social networking web site. Rather, the password with which the export group identifier is associated controls access to the confidential information that has been associated with the export group identifier.

The password can have different levels or layers of granularity. The password may be specific just to the export group identifier itself, and not to the identity of any third party. As such, any third party that has the user identifier, the export group identifier, and the password is able to access the confidential information. By comparison, the password may be specific both to the export group identifier and to the identity of a particular third party. As such, just the third party in question can access the confidential information; a different third party that nevertheless has the user identifier, the export group identifier, and the password is still unable to access the information.

The password can have a validity period. As such, the password is invalid and does not permit access to the confidential information outside of the validity period. The validity period may be specified in terms of dates, number of days, and so on. The password can have a maximum number of uses. As such, the password is invalid and does not permit access to the confidential information once it has been used more than the maximum number of uses. A combination of these various levels or layers of granularity, as well as other layers of granularity, can further be accorded to the password.

The export group identifier and the password are thus adapted to be shared by the user, along with his or her user identifier, to a third party to permit the third party to access the confidential information through the social networking web site. The export group identifier, password, and/or user identifier can be shared to the user in a number of different ways. A user may simply verbally communicate or handwrite such access information to or for a third party. This access information can be encoded within a barcode, a quick response (QR) code, or another type of code for optical scanning, or within an RFID tag. The access information can be wirelessly transmitted by Bluetooth or in another manner.

FIG. 2 shows a method 200, according to an embodiment of the disclosure. The method 200 is performed after the method 100 has been performed, and once a user has shared his or her user identifier, the export group identifier, and the password with a third party. As such, a purported user identifier, a purported export group identifier, and a purported password are received from the third party via access of the social networking web site (202). The third party may manually enter this purported access information into the web site. A computer program under control or authorization of the third party may also submit a secure transaction that includes a markup language form indicating the confidential information being requested.

The purported user identifier, the purported export group identifier, and the purported password are validated (204). It is said that the purported user identifier, the purported export group identifier, and the purported password are validated against the user identifier, the export group identifier, and the password that were associated within the method 100. For instance, validation can include first determine whether the purported user identifier is a valid user identifier. If so, validation can then include determining whether an export group identifier identical to the purported export group identifier is associated with this user identifier. If so, validation can finally include determining whether the purported password is identical to the password associated with this export group identifier. If so, then validation is successful. If any of these three process steps, parts, or acts is unsuccessful, then validation is unsuccessful.

Where validation is successful, then the third party is permitted to access the confidential information with which the export group identifier has been associated (206). For instance, the confidential information may be displayed to the third party. If the purported access information was submitted via a secure transaction, the markup language form may be populated with the confidential information that has been requested and transmitted back to the computer program under control or authorization of the third party. In this case, it is noted that the markup language form initially submitted within the secure transaction is blank or empty.

The access that the third party is permitted to the confidential information regarding the user can take one of a number of different types of forms, which can further vary for each kind or piece of confidential information. The access may be read-only access. As such, the third party can retrieve the confidential information, but is not permitted to modify or add to the confidential information. For instance, no third party may be permitted to change the user's social security number, although some third parties may be permitted to retrieve the user's social security number.

The access may be append-only access. As such, a third party can add to the confidential information but is not permitted to retrieve or modify the confidential information. For example, a laboratory may be permitted to add new blood test results to the confidential information regarding the user. However, the laboratory may not be permitted to retrieve results of blood tests taken in the past. The access may be read-and-append access. As such, a third party can retrieve and add to the confidential information, but is not permitted to modify the confidential information. In the previous example, for instance, the laboratory may be permitted to add new blood test results and results of blood tests taken in the past, but may not be permitted to change any of the results of the blood tests taken in the past.

The access may be read-and-change access. As such, a third party can retrieve and modify the confidential information regarding the user. However, the third party is not permitted to add to, or append, the confidential information. The access may be read-append-and-change access. As such, a third party can retrieve, modify, and add to the confidential information regarding the user.

FIG. 3 shows a method 300, according to an embodiment of the disclosure. The method 300 is performed in conjunction with the methods 100 and 200. Specifically, part 302 of the method 300 is performed in conjunction with the method 100. By comparison, parts 304 and 306 of the method 300 are performed in conjunction with the method 200.

The method 300 safeguards the confidential information regarding a user against some types of nefarious access. For example, a user may have printed his or her user identifier, a group export identifier, and a password on a card, and not realize that he or she has lost the card. The method 300 helps prevent unauthorized third parties from nevertheless gaining access to the confidential information regarding the user, even when such third parties have in their possession the access information.

The export group identifier is associated with a permissible third party type (302). The permissible third party type indicates the type of third parties that have access to the confidential information regarding the user with which the export group identifier has been identified. For example, for a "medical" export group, the permissible third party type may be medical users, such as doctors.

The third party that is providing the purported access information within the method 200 has its type authenticated (304). For instance, each third party may have to as part of a registration process with the social networking web site indicate the type of third party that it is, and this information may be verified. Authentication in part 304 thus means that the type of the third party providing the purported access information matches the permissible third party type associated with the export group identifier. Validation continues within the method 200 only if the third party type has been successfully authenticated against the permissible third party type associated with the export group identifier (306).

The method 300 thus helps safeguard the confidential information regarding a user. As an example, a user may be at the office of his or her doctor, and lose a card on which the user has printed his or her user identifier, a group export identifier, and a password. A nefarious user present at the office may pick up the card, and thus have this access information. However, if the nefarious user does not have the permissible third party type—e.g., the nefarious user is not a medical user—then the nefarious user still does gain access to the confidential information. This is the case even though the nefarious user has knowledge of the user identifier, the export group identifier, and the password.

FIG. 4 shows a representative and rudimentary system 400, according to an embodiment of the disclosure. The system 400 includes a user client device 402A and a third party client device 402B, which are collectively referred to as the client devices 402. Examples of client devices 402 include computing devices like desktop and laptop computers, as well as more mobile devices like smartphones. The system 400 also includes a server computing device 404 for a social networking web site. The server computing device 404 performs the method 100 and part 302 of the method 300 in relation to the user client device 402A. The sever computing device 404 performs the method 200 and parts 304 and 306 of the method 300 in relation to the third party client device 402B. The client devices 402 are communicatively interconnected via a network 406, which may be or include the Internet, an intranet, an extranet, a local-area network (LAN), a wide-area network (WAN), a telephony network, and so on.

Figure 5:
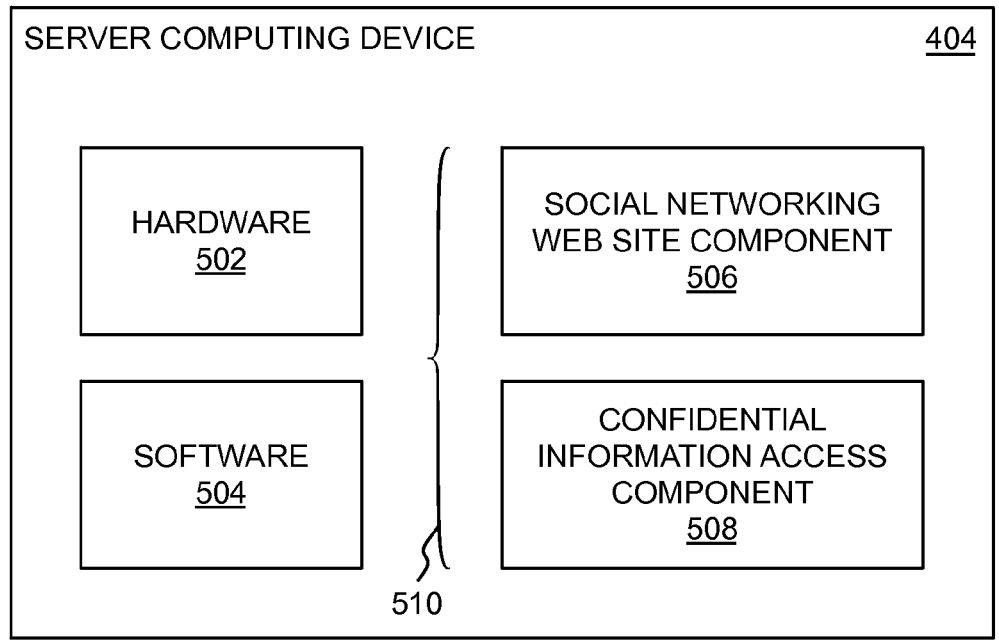
FIG. 5 is a diagram of a representative server computing device for a social networking web site, according to an embodiment of the disclosure

FIG. 5 shows a representative and rudimentary server computing device 404 for a social networking web site, according to an embodiment of the disclosure. The server computing device 404 includes hardware 502 and software 504. For instance, the hardware 502 can include processors, memory, storage devices, network adapters, and so on. The software 504 can include operating systems, web server computer programs, database computer programs and so on.

The server computing device 404 is said to further include a social networking web site component 506 and a confidential information access component 508. As indicated by the curly brace 510, the components 506 and 508 are implemented via the hardware 502 and/or the software 504, and thus are implemented at the server computing device 404. The social networking web site component 506 provides the social networking web site itself. By comparison, the confidential information access component 508 provides the functionality that has been described in relation to the methods 100, 200, and 300 above.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   receiving, by a server computing device for a social networking web site, a user confidential information regarding the user;
   associating, by the server computing device, the confidential information regarding the user with an export group identifier identifying a type of the confidential information regarding the user and not identifying a group that other users of the social networking web site are able to join; and
   associating, by the server computing device, the export group identifier with a password required to access the confidential information,
   wherein the export group identifier and the password are adapted to be shared by the user to a third party to permit the third party to access the confidential information through the social networking web site, where knowledge of a user name of the user, the export group identifier, and the password are required for the third party to input to access the confidential information, the password being different than the export group identifier.

2. The method of claim 1, further comprising:
receiving, by the server computing device for the social networking web site from a third party via access of the social networking web site, a purported user identifier, a purported export group identifier, and a purported password;
validating, by the server computing device for the social networking web site, the purported user identifier, the purported export group identifier, and the purported password against the user identifier, the export group identifier, and the password, respectively; and,
where validation is successful, permitting, by the server computing device for the social networking web site, access to the confidential information regarding the user by the third party.

3. The method of claim 2, wherein permitting access to the confidential information regarding the user by the third party comprises permitting one of:
read-only access to the confidential information regarding the user by the third party, such that the third party is permitted to retrieve the confidential information but is not permitted to modify or add to the confidential information;
append-only access to the confidential information regarding the user by the third party, such that the third party is permitted to add to the confidential information but is not permitted to retrieve or modify the confidential information;
read-and-append access to the confidential information regarding the user by the third party, such that the third party is permitted to retrieve and add to the confidential information but is not permitted to modify the confidential information;
read-and-change access to the confidential information regarding the user by the third party, such that the third party is permitted to retrieve and modify the confidential information but is not permitted to add to the confidential information;
read-append-and-change access to the confidential information regarding the user by the third party, such that the third party is permitted to retrieve, add to, and modify the confidential information.

4. The method of claim 2, further comprising:
associating, by the server computing device for the social networking web site, the export group identifier with a permissible third party type;
authenticating, by the server computing device for the social networking web site, a type of the third party from which the purported user identifier, the purported export group identifier, and the purported password have been received;
after authenticating the type of the third party, continuing to validate the purported user identifier, the purported export group identifier, and the purported password received from the third party, by the server computing device for the social networking web site only where the type of the third party matches the permissible third party type,
such that even where the third party has knowledge of the user identifier, the export group identifier, and the password, the third party cannot gain access to the confidential information regarding the user if the type of the third party does not match the permissible third party type.

5. The method of claim 2, wherein receiving the purported user identifier, the purported export group identifier, and the purported password from the third party comprises receiving a secure transaction that includes a markup language form indicating the confidential information being requested,
and wherein permitting access to the confidential information regarding the user by the third party comprises populating the markup language form with the confidential information that has been requested and transmitting the markup language form back to the third party.

6. The method of claim 1, wherein the password is specific just to the export group identifier and not to an identity of the third party.

7. The method of claim 1, wherein the password is specific both to the export group identifier and to an identity of the third party.

8. The method of claim 1, wherein the password has a validity period, such that the password is invalid and does not permit access to the confidential information outside of the validity period.

9. The method of claim 1, wherein the password has a maximum number of uses, such that the password is invalid and does not permit access to the confidential information after the password has been used more than the maximum number of uses.

10. A method comprising:
receiving, by a server computing device for a social networking web site from a third party via access of the social networking web site, a purported user identifier, a purported export group identifier, and a purported password;
validating, by the server computing device for the social networking web site, the purported user identifier, the purported export group identifier, and the purported password against a user identifier, an export group identifier, and a password, respectively,
wherein confidential information regarding a user is associated with the export group identifier, the export group identifier identifying a type of the confidential information regarding the user and not identifying a group that other users of the social networking web site are able to join,
wherein the export group identifier is associated with a password required to access the confidential information,
wherein the export group identifier and the password are adapted to be shared by the user to the third party to permit the third party to access the confidential information through the social networking web site, where knowledge of a user name of the user, the export group identifier, and the password are required for the third party to input to access the confidential information, the password being different than the export group identifier; and
where validation is successful, permitting, by the server computing device for the social networking web site, access to the confidential information regarding the user by the third party.

11. The method of claim 10, wherein permitting access to the confidential information regarding the user by the third party comprises permitting one of:
read-only access to the confidential information regarding the user by the third party, such that the third party is permitted to retrieve the confidential information but is not permitted to modify or add to the confidential information;

append-only access to the confidential information regarding the user by the third party, such that the third party is permitted to add to the confidential information but is not permitted to retrieve or modify the confidential information;
read-and-append access to the confidential information regarding the user by the third party, such that the third party is permitted to retrieve and add to the confidential information but is not permitted to modify the confidential information;
read-and-change access to the confidential information regarding the user by the third party, such that the third party is permitted to retrieve and modify the confidential information but is not permitted to add to the confidential information;
read-append-and-change access to the confidential information regarding the user by the third party, such that the third party is permitted to retrieve, add to, and modify the confidential information.

12. The method of claim 10, further comprising:
authenticating, by the server computing device for the social networking web site, a type of the third party from which the purported user identifier, the purported export group identifier, and the purported password have been received,
where the export group identifier is associated with a permissible third party type;
after authenticating the type of the third party, continuing to validate the purported user identifier, the purported export group identifier, and the purported password received from the third party, by the server computing device for the social networking web site only where the type of the third party matches the permissible third party type,
such that even where the third party has knowledge of the user identifier, the export group identifier, and the password, the third party cannot gain access to the confidential information regarding the user if the type of the third party does not match the permissible third party type.

13. The method of claim 10, wherein receiving the purported user identifier, the purported export group identifier, and the purported password from the third party comprises receiving a secure transaction that includes a markup language form indicating the confidential information being requested,
and wherein permitting access to the confidential information regarding the user by the third party comprises populating the markup language form with the confidential information that has been requested and transmitting the markup language form back to the third party.

14. The method of claim 10, wherein the password is specific just to the export group identifier and not to an identity of the third party.

15. The method of claim 10, wherein the password is specific both to the export group identifier and to an identity of the third party.

16. The method of claim 10, wherein the password has a validity period, such that the password is invalid and does not permit access to the confidential information outside of the validity period.

17. The method of claim 10, wherein the password has a maximum number of uses, such that the password is invalid and does not permit access to the confidential information after the password has been used more than the maximum number of uses.

18. A computer program product comprising:
a storage device storing computer-readable code executable by a processor by a server computing device for a social networking web site and comprising:
first computer-readable code to receive from a user confidential information regarding the user;
second computer-readable code to associate the confidential information regarding the user with an export group identifier identifying a type of the confidential information regarding the user and not identifying a group that other users of the social networking web site are able to join; and
third computer-readable code to associate the export group identifier with a password required to access the confidential information,
wherein the export group identifier and the password are adapted to be shared by the user to a third party to permit the third party to access the confidential information through the social networking web site, where knowledge of a user name of the user, the export group identifier, and the password are required for the third party to input to access the confidential information, the password being different than the export group identifier.

19. The computer program product of claim 18, wherein the computer-readable code further comprises:
fourth computer-readable code to receive, from a third party via access of the social networking web site, a purported user identifier, a purported export group identifier, and a purported password;
fifth computer-readable code to validate the purported user identifier, the purported export group identifier, and the purported password against the user identifier, the export group identifier, and the password, respectively; and,
sixth computer-readable code to, where validation is successful, permit access to the confidential information regarding the user by the third party.

20. A system comprising:
a server computing device;
a social networking web site component implemented at the server computing device to provide a social networking web site;
a confidential information access component implemented at the server computing device to:
receive, from a third party via access of the social networking web site, a purported user identifier, a purported export group identifier, and a purported password;
validate the purported user identifier, the purported export group identifier, and the purported password against a user identifier, an export group identifier, and a password, respectively,
wherein confidential information regarding a user is associated with the export group identifier, the export group identifier identifying a type of the confidential information regarding the user and not identifying a group that other users of the social networking web site are able to join,
wherein the export group identifier is associated with a password required to access the confidential information,
wherein the export group identifier and the password are adapted to be shared by the user to the third party to permit the third party to access the confidential information through the social networking web site, where knowledge of a user name of the user, the export group identifier, and the password are required for the third party to input to access the confidential information, the password being different than the export group identifier; and where validation is successful, permit access to the confidential information regarding the user by the third party.

* * * * *